(12) United States Patent
Kosaka et al.

(10) Patent No.: US 9,274,298 B2
(45) Date of Patent: Mar. 1, 2016

(54) DEFORMED STEEL WIRE FOR PROTECTION TUBE OF SUBMARINE CABLE, METHOD FOR MANUFACTURING SAME, AND PRESSURE-RESISTANT LAYER

(71) Applicants: NIPPON STEEL & SUMITOMO METAL CORPORATION, Tokyo (JP); Namitei Co., Ltd., Higashiosaka-shi, Osaka (JP); OCC Corporation, Yokohama-shi, Kanagawa (JP)

(72) Inventors: Makoto Kosaka, Tokyo (JP); Shouichi Ohashi, Tokyo (JP); Seiki Nishida, Tokyo (JP); Masatsugu Murao, Osaka (JP); Kouichi Murao, Osaka (JP); Ken Oyamada, Osaka (JP); Syunya Ikebata, Osaka (JP)

(73) Assignees: NIPPON STEEL & SUMITOMO METAL CORPORATION, Tokyo (JP); Namitei Co., Ltd., Higashiosaka-shi, Osaka (JP); OCC Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 14/423,810

(22) PCT Filed: Oct. 3, 2013

(86) PCT No.: PCT/JP2013/076996
§ 371 (c)(1),
(2) Date: Feb. 25, 2015

(87) PCT Pub. No.: WO2014/054756
PCT Pub. Date: Apr. 10, 2014

(65) Prior Publication Data
US 2015/0301297 A1 Oct. 22, 2015

(30) Foreign Application Priority Data

Oct. 4, 2012 (JP) .................................. 2012-222347

(51) Int. Cl.
*G02B 6/44* (2006.01)
*B21B 1/16* (2006.01)
*C21D 8/06* (2006.01)
*C22C 38/00* (2006.01)

*C22C 38/04* (2006.01)
(Continued)

(52) U.S. Cl.
CPC . *G02B 6/443* (2013.01); *B21B 1/16* (2013.01); *B21C 1/003* (2013.01); *C21D 8/06* (2013.01);
(Continued)

(58) Field of Classification Search
None
See application file for complete search history.

(56) References Cited

U.S. PATENT DOCUMENTS

| 2006/0154101 | A1 | 7/2006 | Ohashi et al. |
| 2015/0004426 | A1* | 1/2015 | Nagata .................. C22C 38/001 428/544 |
| 2015/0229036 | A1* | 8/2015 | Yoshinaga ................ C22C 9/00 174/74 R |

FOREIGN PATENT DOCUMENTS

| JP | 62-202051 A | 9/1987 |
| JP | 62-228431 A | 10/1987 |

(Continued)

OTHER PUBLICATIONS

International Search Report issued in PCT/JP2013/076996, mailed on Jan. 14, 2014.

*Primary Examiner* — Sung Pak
(74) *Attorney, Agent, or Firm* — Birch, Stewart, Kolasch & Birch, LLP

(57) ABSTRACT

There is provided a deformed steel wire includes, as a chemical component, by mass %; C: 0.30% to 1.10%, Si: 0.10% to 1.50%, and Mn: 0.20% to 1.50%, and the balance consists of Fe and unavoidable impurities, in which a metallographic structure is a ferrite-pearlite structure or a pearlite structure, integration degrees of a crystal orientation <110> in a longitudinal direction of a thickness center area and a surface area are in a range of 2.0 to 4.0, an absolute value of a difference in the integration degree between an inner surface and an outer surface of the surface area is 0.3 or less, an integration degree of a crystal orientation <100> in a thickness direction of the thickness center area is in a range of 1.2 to 3.8, and a dimensional accuracy index is in a range of 0.5 to 2.0.

10 Claims, 2 Drawing Sheets

(51) Int. Cl.
*C22C 38/32* (2006.01)
*C22C 38/02* (2006.01)
*C22C 38/18* (2006.01)
*B21C 1/00* (2006.01)

(52) U.S. Cl.
CPC ............... *C21D 8/065* (2013.01); *C22C 38/00* (2013.01); *C22C 38/02* (2013.01); *C22C 38/04* (2013.01); *C22C 38/18* (2013.01); *C22C 38/32* (2013.01); *G02B 6/4427* (2013.01); *C21D 2211/005* (2013.01); *C21D 2211/009* (2013.01)

(56) References Cited

FOREIGN PATENT DOCUMENTS

| | | |
|---|---|---|
| JP | 6-235024 A | 8/1994 |
| JP | 2003-301239 A | 10/2003 |
| JP | 2003-301240 A | 10/2003 |
| JP | 2004-151258 A | 5/2004 |
| JP | 2004-277759 A | 10/2004 |
| JP | 2010-229469 A | 10/2010 |

* cited by examiner

DEFORMED STEEL WIRE FOR PROTECTION TUBE OF SUBMARINE CABLE, METHOD FOR MANUFACTURING SAME, AND PRESSURE-RESISTANT LAYER

TECHNICAL FIELD OF THE INVENTION

The present invention relates to a deformed steel wire for a protection tube of a submarine cable having a hollow-fan shape, which is cut out from a doughnut-shape, on a cross section perpendicular to the longitudinal direction, a high tensile strength of 1200 MPa or more, and excellent low-cycle fatigue properties, a method for manufacturing the same, and a pressure-resistant layer.

Priority is claimed on Japanese Patent Application No. 2012-222347, filed on Oct. 4, 2012, the content of which is incorporated herein by reference.

BACKGROUND ART

A protection tube for an optical fiber and the like is formed by combining three deformed steel wires, which have a hollow-fan shape (that is, cut up a doughnut into fan shapes) of cross section, in a cylindrical shape. An optical fiber is protected from an external force by being inserted into the protection tube, and the protection tube serves as a pressure-resistant layer. To decrease the installation costs of a cable, there has been a demand for the weight reduction of the protection tube or the pressure-resistant layer, and thus far, there have been proposals regarding, for example, a deformed steel wire having a high tensile strength as disclosed in Patent Documents 1 to 4. The deformed steel wire is manufactured by drawing a wire rod, and then deforming the wire rod so as to form a substantially hollow-fan shape of cross section. Therefore, for example, a high-strength steel wire satisfying both conditions of cold workability and high strength is proposed in Patent Document 5. Here, the wire rod refers to a material of a steel wire. In addition, the steel wire is a collective term for a deformed steel wire and steel wires other than the deformed steel wire.

To satisfy the cold workability and high strength of a steel wire, an increase in the cementite fraction, the strengthening of ferrite by a solid solution of Si or the like, and a decrease in the lamella spacing of pearlite are effective. The above-described steel wire is manufactured by, for example, hot rolling a steel piece, which includes a great amount of C, produced by adding Si, Cr, and the like as necessary, so as to produce a wire rod, furthermore, heating the wire rod up to an austenite region, then, cooling the wire rod, and carrying out a patenting treatment for isothermal transformation after the cooling.

A deformed steel wire of the related art having a high tensile strength satisfied both conditions of high strength and high ductility using the metallographic structure of a steel wire that had been subjected to hot rolling or patenting treatment. In addition, regarding a drawing process or a deforming process for manufacturing a deformed steel wire satisfying both conditions of high strength and high ductility, for example, methods for adjusting the reduced cross-sectional area or the caliber shape of a roller to prevent wire rapture have been proposed in Patent Documents 2 and 3.

However, for example, the technology that adjusts the reduced cross-sectional area or the caliber shape of a roller, which is disclosed in Patent Documents 2 and 3, is effective to ensure the tensile strength of a deformed steel wire, but it cannot be said that a deformed steel wire obtained using this technology has excellent low-cycle fatigue properties. In addition, for example, in Patent Document 1, there is no regulation regarding the texture or the dimensional accuracy, and thus it is difficult to satisfy both conditions of the uniformity of the tensile strength and excellent low-cycle fatigue properties, that is, durability.

Furthermore, when a power cable or a communication cable is installed in the ocean from a vessel, the cable is affected by bad weather, ocean waves, and the like within a short period of time during which the cable reaches the ocean floor, particularly, the deep ocean floor and is stabilized. Therefore, there is a case in which great tension is repeatedly applied to the cable due to water pressure or tidal force, and the breakage of the cable due to the low-cycle fatigue is concerned. Therefore, the deformed steel wire protecting an optical fiber and the like is required to have low-cycle fatigue properties.

PRIOR ART DOCUMENT

Patent Document

[Patent Document 1] Japanese Unexamined Patent Application, First Publication No. S62-228431
[Patent Document 2] Japanese Unexamined Patent Application, First Publication No. 2003-301239
[Patent Document 3] Japanese Unexamined Patent Application, First Publication No. 2003-301240
[Patent Document 4] Japanese Unexamined Patent Application, First Publication No. 2004-277759
[Patent Document 5] Japanese Unexamined Patent Application, First Publication No. 2010-229469

DISCLOSURE OF THE INVENTION

Problems to be Solved by the Invention

The invention has been made in consideration of the above-described circumstances, and particularly, an object of the invention is to provide a deformed steel wire for a protection tube of a submarine cable that is preferable to protect a submarine cable and has a high strength and excellent low-cycle fatigue properties, a method for manufacturing the same, and a pressure-resistant layer.

Means for Solving the Problem

The summary of the invention is as described below.

(1) According to an aspect of the invention, there is provided a deformed steel wire including, as a chemical component, by mass %; C: 0.30% to 1.10%, Si: 0.10% to 1.50%, Mn: 0.20% to 1.50%, P: limited to 0.020% or less, S: limited to 0.020% or less, and the balance consisting of Fe and impurities, in which a metallographic structure includes a ferrite-pearlite structure or a pearlite structure, a cross section perpendicular to a longitudinal direction has a hollow-fan shape, which is cut out from a doughnut-shape, in a thickness center area, an inner surface area, and an outer surface area on the cross section, integration degrees of a crystal orientation <110> in the longitudinal direction are respectively in a range of 2.0 to 4.0, an absolute value of a difference in the integration degree of the crystal orientation <110> in the longitudinal direction between the inner surface area and the outer surface area on the cross section is 0.3 or less, in the thickness center area on the cross section, an integration degree of a crystal orientation <100> in a thickness direction is in a range of 1.2 to 3.8, and when inner angles at two facing edges of an inner surface on the cross section are represented by R1 and R2 respectively, a dimensional accuracy index represented by a ratio of the R2 to the R1 is in a range of 0.5 to 2.0.

(2) In the deformed steel wire according to the above-described (1), the chemical component may further include, by mass %, either or both of Cr: 0.01% to 1.00% and B: 0.0004% to 0.0030%.

(3) In the deformed steel wire according to the above-described (1) or (2), the tensile strength obtained from a tensile test based on JIS Z 2241 is 1200 MPa or more; and in a low-cycle fatigue test in which a strain amplitude Δε is set in a range of 2% to 6%, a strain velocity c' is set to 0.4%/s, and a test waveform is set to a triangle wave having a repetition velocity of 0.050 Hz, a low-cycle fatigue coefficient A computed from $A = Nf/\Delta\epsilon^{-0.3885}$ (Formula 1) may be 15 or more.

(4) According to another aspect of the invention, there is provided a method for manufacturing the deformed steel wire according to any one of the above-described (1) to (3) including drawing process of drawing a steel wire material having a metallographic structure of a ferrite-pearlite structure or a pearlite structure so as to obtain an intermediate steel wire; and after the drawing process, deforming process of deforming the intermediate steel wire so as to obtain a deformed steel wire; in which, during the drawing, when a percentage of a ratio of a reduced cross-sectional area obtained by subtracting a cross-sectional area of the intermediate steel wire from a cross-sectional area of the steel wire material to a total reduced cross-sectional area obtained by subtracting a cross-sectional area of the deformed steel wire from the cross-sectional area of the steel wire material is set to a drawing fraction, the drawing is carried out at the drawing fraction in a range of 30% to 85%, and during the deforming process, an operation diameter of a roller is set in a range of 210 mm to 350 mm, a friction coefficient between a surface of the roller and the intermediate steel wire is set in a range of 0.05 to 0.2, back tension is set in a range of 2% to 7% of a breaking load of the intermediate steel wire, which has been obtained in advance, and the deforming is carried out.

(5) According to a still another aspect of the invention, there is provided a pressure-resistant layer including three deformed steel wires according to any one of the above-described (1) to (3); and an optical communication fiber, in which the three deformed steel wires are combined in a cylindrical shape around the optical communication fiber.

Effects of the Invention

According to the respective aspects of the invention, it is possible to provide a high-strength deformed steel wire for a protection tube of a submarine cable having significantly improved durability compared with a deformed steel wire of the related art, a method for manufacturing the same, and a pressure-resistant layer. The use of this deformed steel wire can suppress the breakage of a cable due to the low-cycle fatigue. In addition, according to the pressure-resistant layer, it is possible to protect an optical communication fiber, and thus the industrial contribution is extremely significant.

EMBODIMENTS OF THE INVENTION

Figure 1:
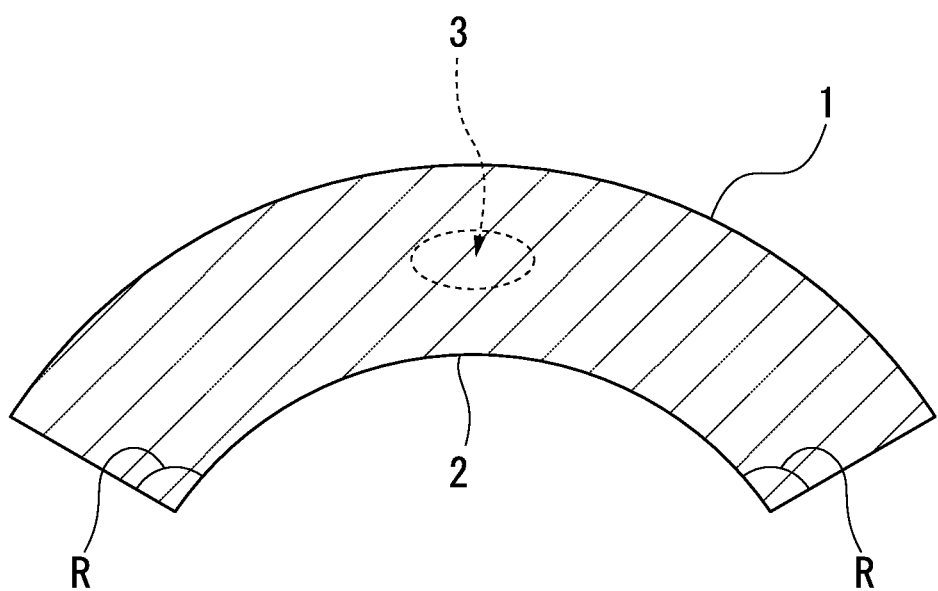
FIG. 1 is a cross-sectional view perpendicular to a longitudinal direction of a deformed steel wire according to an embodiment of the invention.

The present inventors repeated tests and studies assiduously to solve the problems of the related art. As a result, the present inventors found that a metallographic structure of a ferrite-pearlite structure or a pearlite structure is adjusted to satisfy the strength and low-cycle fatigue properties of a deformed steel wire. Also, it was found that, when the conditions of a drawing process and a deforming process are controlled, it becomes possible to control a texture in a crystal orientation <110> of a longitudinal direction or a crystal orientation <100> of a thickness direction on a lengthwise cross section of the deformed steel wire having a hollow-fan shape (that is, cut up a doughnut into fan shapes) or the dimensional accuracy of inner angles R at two edges of an inner surface in the cross section. Hereinafter, the hollow-fan shape (that is, cut up a doughnut into fan shapes) of cross section of the deformed steel wire for a protection tube of a submarine cable according to the embodiment perpendicular to the longitudinal direction will, in some cases, be referred to as the cross section perpendicular to the longitudinal direction, the cross section having a hollow-fan shape, or simply the cross section. Hereinafter, the deformed steel wire for a protection tube of a submarine cable is a deformed steel wire, and will, in some cases, be referred to as the deformed steel wire.

Furthermore, the inventors found that the properties of the deformed steel wire are significantly changed depending on a texture formed by the drawing and the deforming, the low-cycle fatigue properties of deformed steel wire having high strength can be improved by controlling the texture, and the conditions of the drawing and the deforming are important for the control of the texture.

Figure 2:
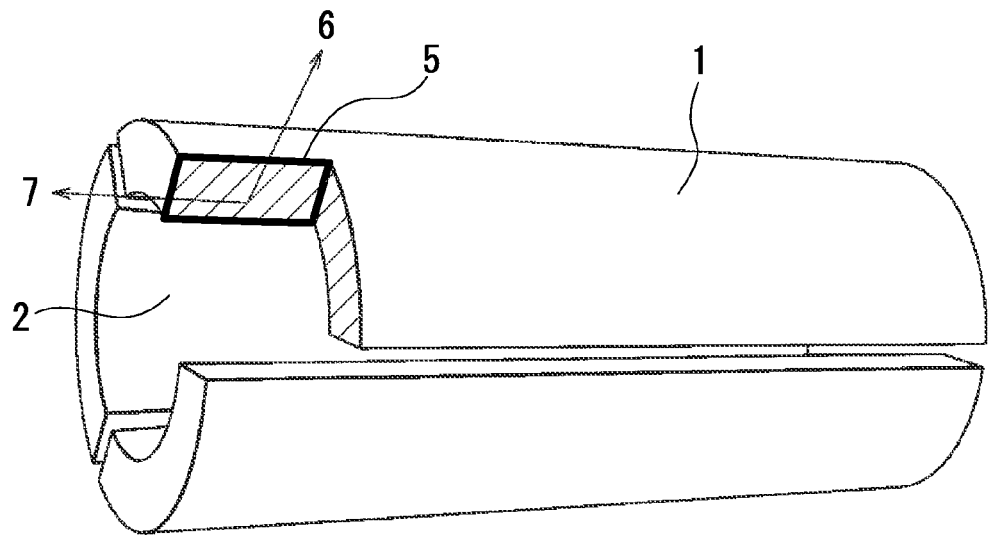
FIG. 2 is a perspective view showing an EBSD measurement surface (TD surface), the longitudinal direction, and a thickness direction in the deformed steel wire according to the embodiment of the invention.
Figure 3:
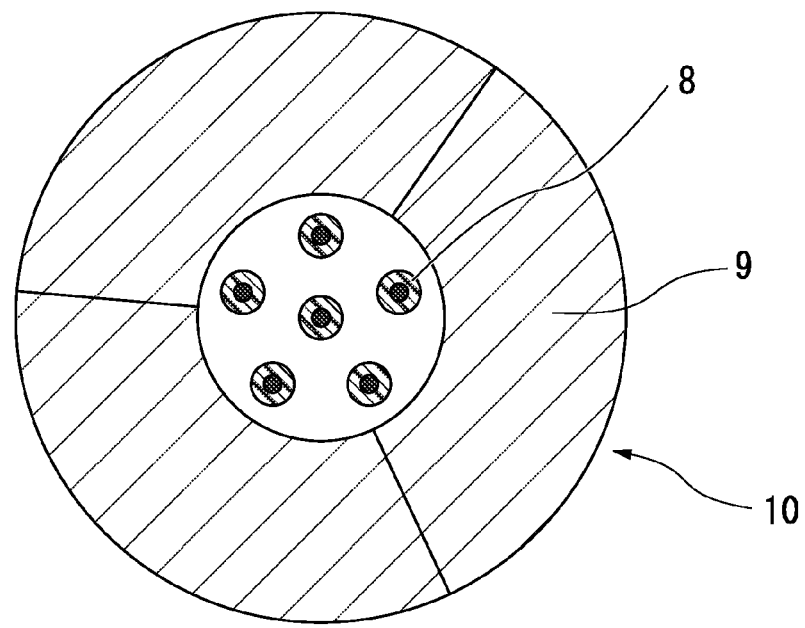
FIG. 3 is a view showing a cross section of a pressure-resistant layer formed by combining three deformed steel wires in a cylindrical shape around an optical communication fiber perpendicular to a longitudinal direction.

FIG. 1 is a cross-sectional view of a deformed steel wire according to an embodiment of the invention perpendicular to a longitudinal direction. FIG. 2 is a perspective view showing an EBSD measurement surface (TD surface), the longitudinal direction, and a thickness direction in the deformed steel wire according to the embodiment of the invention. FIG. 3 is a view showing a cross section of a pressure-resistant layer formed by combining three deformed steel wires in a cylindrical shape around an optical communication fiber perpendicular to a longitudinal direction. As shown in FIG. 3, a pressure-resistant layer 10 in a submarine cable or the like is formed by combining three deformed steel wires 9 having a hollow-fan shape, which is cut out from a doughnut-shape, on a cross section perpendicular to the longitudinal direction in a cylindrical shape on a lengthwise cross section around an optical communication fiber 8. The cross-sectional shape of the deformed steel wire 9 perpendicular to the longitudinal direction is a hollow-fan shape formed by two arcs on an outer surface and an inner surface having different radii and having a central angle of 120° and two edge surfaces intersecting each other at a central angle of 120° as shown in FIG. 1. As shown in FIG. 1, in this cross section having a hollow-fan shape, the arc on the inner surface is set to an inner surface area 2, and the arc on the outer surface is set to an outer surface area 1. The above-described cross-sectional shape of the deformed steel wire 9 is formed by drawing a steel wire material manufactured through hot rolling, and deforming an intermediate steel wire obtained from the drawing.

The metallographic structure of the deformed steel wire for a protection tube of a submarine cable according to the embodiment includes pearlite and ferrite having excellent tensile strength and cold workability, and a texture is a structure where an crystal orientation <110> of the longitudinal direction is integrated on the lengthwise cross section of the deformed steel sheet, that is, a texture is a structure where the crystal orientation <110> is oriented in the longitudinal direction that is a drawing direction of the deformed steel wire. To increase the tensile strength of the deformed steel wire, it is necessary to increase the integration degree of the crystal orientation <110> in the longitudinal direction. Here, the integration degree indicates the degree that a crystal orientation is integrated in a certain orientation, as a standard that the integration degree is 1 when a crystal orientation is random. However, the inventors found that, when the uniformity of the integration degree of the crystal orientation <110> in the longitudinal direction is impaired in the inner surface area and the outer surface area on the cross section having a hollow-fan shape, which is cut out from a doughnut-shape, in the longitudinal direction of the deformed steel wire, the low-cycle fatigue properties degrade in spite of a high integration degree. Here, the crystal orientation <110> in the longitudinal direction on the cross section of the deformed steel sheet having a hollow-fan shape represents a crystal orientation running along the normal direction to a {110} crystal plane in a body-centered cubic lattice crystal. That is, the integration of the crystal orientation <110> in the longitudinal direction means that {110} crystal planes integrate in parallel with a cross section perpendicular to the longitudinal direction.

Therefore, the inventors carried out studies to decrease the difference in the integration degree of the crystal orientation <110> in the longitudinal direction between the inner surface area 2 and the outer surface area 1 on the cross section having a hollow-fan shape in the longitudinal direction of the deformed steel wire as shown in FIG. 1. As a result, the inventors found that it is possible to uniformly hold the integration degree of the crystal orientation <110> on the lengthwise cross section of the deformed steel wire between the inner surface area 2 and the outer surface area 1, and furthermore to prevent the deterioration of the low-cycle fatigue properties by controlling the operation diameter of a roller in a rolling machine during drawing or deforming and by controlling the friction coefficient between the surface of the roller in the rolling machine and an intermediate steel wire during drawing or deforming. Furthermore, the inventors obtained knowledge that the low-cycle fatigue properties can be improved by suppressing a decrease in the integration degree of the crystal orientation <100> in a thickness direction perpendicular to the longitudinal direction in a thickness center area 3 on the lengthwise cross section of the deformed steel wire.

Hereinafter, the deformed steel wire for a protection tube of a submarine cable, the method for manufacturing the same, and the pressure-resistant layer according to the embodiment of the invention, which have been made on the basis of the above-described knowledge, will be described in detail.

First, the chemical component of the deformed steel wire for a protection tube of a submarine cable according to the embodiment and the reasons for limiting the component composition will be described. '%' in relation to the amounts of the following elements represent mass %.

C: 0.30% to 1.10%

C is an element that generates cementite and increases the strength. When the C content is less than 0.30%, the work hardening rate of steel is low, and it is not possible to increase the tensile strength after drawing and deforming. Therefore, the lower limit of the C content is set to 0.30%. Furthermore, to increase the tensile strength, the C content is preferably set to 0.60% or more, and more preferably set to 0.70% or more. On the other hand, when the C content exceeds 1.10%, pro-eutectoid cementite is generated, and the cold workability deteriorates. Furthermore, when the C content exceeds 1.10%, the deformed steel wire breaks during a drawing process or a deforming process, and thus the upper limit of the C content is set to 1.10%. In addition, the C content is preferably 1.00% or less, and more preferably 0.90% or less.

Si: 0.10% to 1.50%

Si is a deoxidizing element, and also contributes to solid solution strengthening. To increase the tensile strength, the deformed steel wire needs to contain 0.10% or more of Si. The Si content is preferably 0.15% or more. On the other hand, when the Si content exceeds 1.50%, an $Al_2O_3$—$SiO_2$-based complex inclusion hardens, and thus the low-cycle fatigue properties of the deformed steel wire deteriorate. Therefore, the upper limit of the Si content is set to 1.50%. Furthermore, the Si content is preferably 1.00% or less, and more preferably 0.50% or less.

Mn: 0.20% to 1.50%

Mn is an element necessary for deoxidation or the fixing of S, and is also an effective element for the improvement of the tensile strength of steel. Therefore, the deformed steel wire needs to contain 0.20% or more of Mn. The Mn content is preferably 0.30% or more, and more preferably 0.40% or more. On the other hand, when the Mn content exceeds 1.50%, MnS and the like segregate in steel and the cold workability deteriorates, and thus the upper limit of the Mn content is set to 1.50%. In addition, to suppress the generation of MnS and improve the low-cycle fatigue properties, the Mn content is preferably set to 1.00% or less, and more preferably set to 0.70% or less.

In the deformed steel wire for a protection tube of a submarine cable according to the embodiment, P and S are impurities, and are limited as described below.

P: 0.020% or less

P is an impurity, and when present in steel, P segregates in a grain boundary, and degrades the ductility. Therefore, it is necessary to limit the P content to 0.020% or less from the viewpoint of ensuring the ductility. It is preferable to limit the P content to 0.015% or less. The lower limit of the P content includes 0%, but it is industrially difficult to set the P content to 0%, and thus the lower limit of the P content may be set to 0.0005%.

S: 0.020% or less

S is an impurity, and when present in steel, S forms a sulfide. For example, S combines with Mn so as to form coarse MnS, and deteriorates the ductility. Therefore, it is necessary to limit the S content to 0.020% or less from the viewpoint of ensuring the ductility. It is preferable to limit the S content to 0.015% or less. The lower limit of the S content includes 0%, but it is industrially difficult to set the S content to 0%, and thus the lower limit of the S content may be set to 0.0005%.

What has been described above is the basic chemical component of the deformed steel wire for a protection tube of a submarine cable according to the embodiment, and the balance consists of iron (Fe) and impurities. Meanwhile, the "impurities" refer to elements that are unavoidably infused from ore and scrap serving as a raw material or a manufacturing environment when steel is industrially manufactured.

The deformed steel wire for a protection tube of a submarine cable according to the embodiment may further contain either or both Cr and B.

Cr: 0.01% to 1.00%

Cr is an element that decreases the lamella spacing of pearlite, and improves the tensile strength. To improve the tensile strength after drawing and deforming, the deformed steel wire preferably contains 0.01% or more of Cr, more preferably contains 0.10% or more of Cr, and still more preferably contains 0.20% or more of Cr. On the other hand, when the Cr content exceeds 1.00%, the pearlitic transformation during an isothermal heat treatment is delayed, and there is a case in which the productivity degrades. Therefore, the upper limit of the Cr content is preferably 1.00%. The Cr content is preferably set to 0.70% or less, and still more preferably set to 0.50% or less.

B: 0.0004% to 0.0030%

B is an element that segregates in a grain boundary and suppresses the generation of pre-eutectoid ferrite or upper bainite. To improve the cold workability, the deformed steel wire preferably contains 0.0004% or more of B, and more preferably contains 0.0005% or more of B. On the other hand, when the B content exceeds 0.0030%, there is a case in which the cold workability or the low-cycle fatigue properties are impaired, and thus the upper limit of the B content is preferably set to 0.0030%. The upper limit of the B content is more preferably set to 0.0020%.

N is an impurity, and when present in steel, N forms a nitride, and deteriorates the low-cycle fatigue properties. Furthermore, N deteriorates the ductility due to strain aging. Meanwhile, the content of N that is an impurity is not particularly specified, and it is desirable to set the N content to 0.006% or less from the viewpoint of ensuring the ductility.

Cu is an impurity, and when present in steel, Cu causes cracking during hot working due to red brittleness or the like. Therefore, it is desirable to set the Cu content to 0.05% or less. It is industrially difficult to set the lower limit of the Cu content to 0%, and unavoidably, approximately 0.005% of Cu is infused from scrap or the like. In addition, there is a case in which 0.005% to 0.05% of Cu is infused.

Ni is an impurity, and when present in steel, Ni deteriorates the cold workability. Therefore, it is desirable to set the Ni content to 0.05% or less. It is industrially difficult to set the Ni content to 0%, and unavoidably, approximately 0.005% of Ni is infused from scrap or the like. In addition, there is a case in which 0.005% to 0.05% of Ni is infused.

As described above, Cu, Ni, and N are impurities. However, there is a possibility of Cu and Ni being infused from scrap during steel making. Therefore, it is desirable to set the Cu content and the Ni content to 0.05% or less. In addition, it is desirable to set the N content to 0.006% or less.

Next, the metallographic structure of the deformed steel wire for a protection tube of a submarine cable according to the embodiment will be described. A ferrite-pearlite structure or a pearlite-only structure is used as the metallographic structure of the deformed steel wire so a high strength can be obtained by drawing. The metallographic structure can be determined using an optical microscope.

Next, the texture on a cross section of the deformed steel wire for a protection tube of a submarine cable according to the embodiment perpendicular to the longitudinal direction will be described. The cross section of the deformed steel wire perpendicular to the longitudinal direction has a hollow-fan shape which is cut out from a doughnut-shape (that is, cut up a doughnut into fan shapes). Generally, in steel having a ferrite-pearlite structure or a pearlite-only structure, a texture in which the crystal orientation <110> in the longitudinal direction integrates develops on the lengthwise cross section of the deformed steel wire along with an increase in the area reduction ratio. Here, the area reduction rate refers to a value that is obtained by dividing the cross-sectional area reduced by working, that is, the reduced cross-sectional area by the cross-sectional area before working, and is expressed as a percentage. The tensile strength of the deformed steel wire for a protection tube of a submarine cable according to the embodiment is improved by an increase in the integration degree of the crystal orientation <110> in the longitudinal direction on the cross section. However, to improve the low-cycle fatigue properties, it is necessary to increase the integration degree of the crystal orientation <100> in the normal direction to a cross section perpendicular to the longitudinal direction of the deformed steel wire, that is, the thickness direction.

The texture on the cross section perpendicular to the longitudinal direction of the deformed steel wire is measured on a Transverse Direction surface of the central area on the cross section in the circumferential direction, that is, on a surface in parallel with the longitudinal direction and the thickness direction. Hereinafter, the Transverse Direction surface will be simply referred to as the TD surface. As the TD surface, a TD surface 5 is shown in FIG. 2. On the TD surface 5 of the deformed steel wire for a protection tube of a submarine cable according to the embodiment shown in FIG. 2, the integration degrees of the crystal orientation <110> in a longitudinal direction 7 and the crystal orientation <100> in a thickness direction 6 are measured using electron backscatter diffraction (EBSD). The measured texture is expressed using the extent of the integration degree that the crystal orientation is a completely random orientation in a material coordinate system having the normal direction that is a direction perpendicular to the longitudinal direction 7 of the deformed steel wire, that is, the thickness direction 6 and a rolling direction that is in parallel with the longitudinal direction 7 of the deformed steel wire as axes. For example, a case in which the integration degree of the crystal orientation <100> in the thickness direction on the TD surface of the deformed steel wire is four means that, compared with a case in which the direction is disposed in a completely random manner, the frequency of the crystal orientation <100> along the thickness direction is four times.

The integration degree of the crystal orientation <110> in the longitudinal direction in parallel with the rolling direction of the deformed steel wire for a protection tube of a submarine cable according to the embodiment is measured in the thickness center area on the cross section, which is perpendicular to the longitudinal direction and has a hollow-fan shape, which is cut out from a doughnut-shape (that is, cut up a doughnut into fan shapes), in the circumferential direction. Specifically, the integration degree is measured at three places of the thickness center area 3 in the thickness direction, the inner surface area 2, and the outer surface area 1 on the cross section shown in FIG. 1. The thickness center area 3 on the cross section in the thickness direction covers a range of 10% of the thickness extending toward the inner surface area 2 and the outer surface area 1 respectively from the center of the cross section in the thickness direction. Therefore, the thickness of the thickness center area 3 on the cross section having a hollow-fan shape is within a range of 20% of the thickness. Furthermore, the inner surface area 2 and the outer surface area 1 on the cross section cover up to 10% of the thickness from the inner surface and the outer surface of the cross section respectively.

In a case in which the integration degree of the crystal orientation <110> in the longitudinal direction is less than 2.0 in any section of the thickness center area in the thickness direction, the inner surface area, and the outer surface area on the cross section, which is perpendicular to the longitudinal direction and has a hollow-fan shape, of the deformed steel wire for a protection tube of a submarine cable according to the embodiment, the tensile strength decreases. On the other hand, when the integration degree of the crystal orientation <110> in the longitudinal direction exceeds 4.0 in any of the thickness center area in the thickness direction, the inner surface area, and the outer surface area on the cross section, the low-cycle fatigue properties degrade. In addition, when a tensile test is carried out, the brittle fracture of the deformed steel wire occurs, and consequently, the tensile strength decreases. This is because an increase in the integration degree of a specific orientation facilitates the dislocation glide in a specific direction, and in the longitudinal direction in parallel with the rolling direction of the deformed steel wire, fatigue cracks propagate across a long distance. In addition, the fact that, on the cross section that is perpendicular to the longitudinal direction of the deformed steel wire and has a hollow-fan shape, the strength becomes uneven at the inner surface area and the outer surface area causes a decrease in the tensile strength. Therefore, on the cross section having a hollow-fan shape, the integration degrees of the crystal orientation <110> in the longitudinal direction in the thickness central section in the thickness direction, the inner surface area, and the outer surface area are set in a range of 2.0 to 4.0.

Furthermore, on the cross section, which is perpendicular to the longitudinal direction and has a hollow-fan shape, of the deformed steel wire for a protection tube of a submarine cable according to the embodiment, when the absolute value of the difference in the integration degree of the crystal orientation <110> in the longitudinal direction measured in the inner surface area and the outer surface area on the cross section exceeds 0.3, the uniformity of the tensile strength decreases. In addition, as a result of the decreased uniformity of the tensile strength, when a low-frequency external force is exerted, the influence of the external force differs on the inner surface and the outer surface of the cross section having a hollow-fan shape. Therefore, the durability, that is, the low-cycle fatigue properties of the deformed steel wire deteriorate. Therefore, on the cross section having a hollow-fan shape, the absolute value of the difference in the integration degree of the crystal orientation <110> in the longitudinal direction measured in the inner surface area and the outer surface area on the cross section having a hollow-fan shape needs to be 0.3 or less.

In addition, on the cross section of the deformed steel wire which is perpendicular to the longitudinal direction and has a hollow-fan shape, the integration degree of the crystal orientation <110> in the longitudinal direction can be increased using the drawing process and the deforming process in the method for manufacturing the deformed steel wire for a protection tube of a submarine cable according to the embodiment. In this case, on the cross section of the deformed steel wire which is perpendicular to the longitudinal direction and has a hollow-fan shape, the dislocation glide in a specific direction becomes easy, and fatigue cracks propagate across a long distance. Therefore, on the cross section of the deformed steel wire which is perpendicular to the longitudinal direction and has a hollow-fan shape, the integration of the crystal orientation <110> in the longitudinal direction is suppressed, and a decrease in the integration degree of the crystal orientation <100> in the normal direction, that is, the thickness direction is suppressed. Therefore, similar to the grain subdivision effect in a polycrystalline aggregate made of isometric grains, the propagation of cracks in the longitudinal direction of the deformed steel wire is prevented by suppressing the dislocation glide in a grain boundary on the cross section of the deformed steel wire which is perpendicular to the longitudinal direction and has a hollow-fan shape.

On the cross section, which is perpendicular to the longitudinal direction and has a hollow-fan shape, of the deformed steel wire for a protection tube of a submarine cable according to the embodiment, the low-cycle fatigue properties of the deformed steel wire can be improved by setting the integration degree of the crystal orientation <100> in the normal direction, that is, the thickness direction of the thickness center area on the cross section to 1.2 or more. The integration degree of the crystal orientation <100> in the thickness direction is preferably set to 1.3 or more, and more preferably set to 1.4 or more. Meanwhile, on the cross section having a hollow-fan shape, even when the integration degree of the crystal orientation <100> in the thickness direction in the thickness center area on the cross section exceeds 3.8, the effect that improves the low-cycle fatigue properties is saturated. Therefore, the upper limit of the integration degree of the crystal orientation <100> in the thickness direction on the cross section is set to 3.8. Therefore, on the cross section having a hollow-fan shape, the integration degree of the crystal orientation <100> in the normal direction, that is, the thickness direction of the thickness center area on the cross section is set in a range of 1.2 to 3.8.

Subsequently, the method for measuring the texture on the cross section, which is perpendicular to the longitudinal direction and has a hollow-fan shape, of the deformed steel wire for a protection tube of a submarine cable according to the embodiment will be described. As shown in FIG. 2, the TD surface 5 in the center of the cross section of the deformed steel wire, which is perpendicular to the longitudinal direction 7 and has a hollow-fan shape, in the circumferential direction is used as a measurement surface, and a specimen is adjusted. That is, on the cross section of the deformed steel wire which is perpendicular to the longitudinal direction 7 and has a hollow-fan shape, when the length measured along the outer circumference curved in an arc shape is set to the sheet width W, and the specimen is cut along the normal direction at a location of W/2 on the arc of the outer circumference from the edge point of the arc. This cross section is the TD surface 5, that is, the measurement surface.

The method for interpreting the texture in which the TD surface is used as the measurement surface on the cross section, which is perpendicular to the longitudinal direction and has a hollow-fan shape, of the deformed steel wire for a protection tube of a submarine cable according to the embodiment is based on knowledge found by the inventor. In the past, in a case in which great plastic working was applied to steel including a pearlite structure, when the texture was interpreted through EBSD on a surface perpendicular to the normal direction, that is, the normal surface or a surface perpendicular to the longitudinal direction, that is, a traverse surface, there was a problem in that it was extremely difficult to obtain information called a Kikuchi line that served as a source of orientation data for EBSD. However, the inventors solved this problem by measuring the texture on the TD surface.

The method for producing a specimen for measuring the texture of the deformed steel wire for a protection tube of a submarine cable according to the embodiment will be described. A specimen is obtained by mechanically cutting the deformed steel wire that has been subjected to the deforming and rolling process along the normal direction at a location of W/2 on the outer circumference from the edge point of the arc using a wet-type high-speed cutter or the like while preventing the addition of strain and heat. Here, W represents the sheet width which is the length measured along the outer circumference on the cross section that is perpendicular to the longitudinal direction and has a hollow-fan shape. After that, the measurement surface, that is, the TD surface in the obtained specimen is polished. Regarding the polishing, at first, the measurement surface is mechanically polished. For mirror polishing carried out as a final process after the mechanical polishing, a buff towel soaked with alumina or diamond particles having a particle diameter in a range of 1 µm to 3 µm is used. Furthermore, to remove strain on the TD surface that is the measurement surface, vibration polishing is carried out using a polishing solution of colloidal silica having a nominal diameter of 0.05 µm. Furthermore, it is desirable to finish the production of the specimen by chemically dissolving the surface of the TD surface through electrolytic polishing or the like.

The method for measuring the texture of the deformed steel wire for a protection tube of a submarine cable according to the embodiment will be described. The texture, that is, the crystal orientation is measured using an EBSD apparatus manufactured by TSL Solution. First, the stain is inclined so that the normal direction to the measurement surface, that is, the TD surface in the specimen obtained using the above-described method forms approximately 70° against the incident direction of an electron beam. Next, an electron beam is radiated to the inclined stage, and is scanned with a fine step. The EBSD pattern generated by the interference of the inelastic scattering of the scanned electron beam is photographed using a CCD camera. In this method for measuring the texture, it is not necessary to particularly limit an area from which the information of crystal orientation is obtained and the scanning step. However, when the size of the ferrite and pearlite block is taken into account, an appropriate area is 40 µm×40 µm, and an appropriate step is 0.5 µm. When the information of the step is obtained from the above-described appropriate area, and is rebuilt in a calculator, an inverse pole figure showing the texture, that is, a crystal orientation map can be obtained.

Based on the crystal orientation map obtained using the above-described method, data regarding the textures in the respective sections of the thickness center area in the thickness direction, the inner surface area, and the outer surface area on the cross section, which is perpendicular to the longitudinal direction and has a hollow-fan shape, of the deformed steel wire for a protection tube of a submarine cable according to the embodiment, that is, the integration degrees of crystal orientations are obtained. The integration degree of the crystal orientation is calculated using an OIM-Analysis manufactured by TSL Solution, and is expressed using the extent of the integration degree that the crystal orientation is a completely random orientation on the TD surface that is the measurement surface and in a material coordinate system having the rolling direction, that is, the longitudinal direction of the deformed steel wire as an axis. The textures in the thickness center area in the thickness direction, the inner surface area, and the outer surface area on the cross section of the deformed steel wire which is perpendicular to the longitudinal direction and has a hollow-fan shape are measured using the above-described method. In addition, in the thickness center area in the thickness direction on the cross section having a hollow-fan shape, the integration degrees of the crystal orientation <110> in the longitudinal direction and of the crystal orientation <100> in the normal direction are obtained. In addition, in the inner surface area, and the outer surface area on the cross section having a hollow-fan shape, the integration degree of the crystal orientation <110> in the longitudinal direction is obtained.

The method for evaluating the dimensional accuracy of the deformed steel wire for a protection tube of a submarine cable according to the embodiment will be described. The deformed steel wire for a protection tube of a submarine cable according to the embodiment has a cross section that is perpendicular to the longitudinal direction and has a hollow-fan shape, and three deformed steel wires are combined around an optical communication fiber in a cylindrical shape for use. Therefore, an extremely favorable dimensional accuracy is required. The dimensional accuracy of the cross section of the deformed steel wire which is perpendicular to the longitudinal direction is evaluated using the ratio between inner angles R at two edges of an inner surface on the cross section having a hollow-fan shape shown in FIG. 1, that is, the dimensional accuracy index. That is, to obtain a sufficient dimensional accuracy, when the inner angles R at two edges of the inner surface are represented by R1 and R2 respectively, the dimensional accuracy index represented by the ratio of the R2 to the R1, that is, R2/R1 needs to be in a range of 0.5 to 2.0. In a case in which the dimensional accuracy index is less than 0.5, or exceeds 2.0, the cross section of the deformed steel wire which is perpendicular to the longitudinal direction and has a hollow-fan shape becomes non-symmetrical on both sides of the normal line connecting the ½ location on the outer circumference and the ½ location on the inner circumference on the cross section, and it is not possible to combine three deformed steel wires in a cylindrical shape around the optical communication fiber.

The mechanical characteristics of the deformed steel wire for a protection tube of a submarine cable according to the embodiment will be described. The mechanical characteristics of the deformed steel wire are evaluated using the tensile strength obtained from a tensile test and the low-cycle fatigue coefficient A obtained from a low-cycle fatigue test. The tensile strength of the deformed steel wire according to the embodiment is tested using a tensile test based on JIS Z 2241. To be used for a protection tube for an optical fiber and the like, the tensile strength of the deformed steel wire needs to be 1200 MPa or more in many cases. When the tensile strength is 1200 MPa or more, a submarine cable or the like does not break even when the cable is affected by tidal force generated during the installation of the cable on the ocean floor. In a case in which the tensile strength of the deformed steel wire is increased using drawing and deforming, it is industrially difficult to obtain a strength exceeding 3000 MPa. Therefore, the tensile strength of the deformed steel wire is preferably in a range of 1200 MPa to 3000 MPa. The fatigue characteristics of the deformed steel wire are evaluated using the low-cycle fatigue coefficient obtained from a low-cycle fatigue test. In the low-cycle fatigue test, the distance between grades is set to 8 mm, and the strain amplitude $\Delta\epsilon$ is set in a range of 2% to 6%. Furthermore, the strain velocity $\epsilon'$ is set to 0.4%/s, the test waveform is set to a triangle wave having a repetition velocity of 0.050 Hz, and strain is applied. As described in Formula (1), a value obtained by dividing the number of repetition until the deformed steel wire breaks obtained from the test, that is, the breakage repetition number Nf by the strain amplitude $\Delta\epsilon^{-0.3885}$ is the low-cycle fatigue coefficient A. When the low-cycle fatigue coefficient A is 15 or more, for example, it is possible to significantly decrease the possibility of breakage due to a low-frequency external force caused by bad weather, ocean waves, and the like when, for example, a communication cable is installed in the ocean from a vessel. It is industrially difficult for the low-cycle fatigue coefficient A to exceed 300, and thus the low-cycle fatigue coefficient A, which is an index evaluating the fatigue properties of the deformed steel wire, is preferably in a range of 15 to 300.

$$A = Nf/\Delta\epsilon^{-0.3885} \qquad \text{(Formula 1)}$$

Next, the method for manufacturing the deformed steel wire for a protection tube of a submarine cable according to the embodiment will be described. A steel wire material serving as a material of the deformed steel wire is obtained by hot rolling a steel piece having adjusted chemical components using a method of the related art such as a converter. The chemical components of the obtained steel wire material are, for example, by mass %, C: 0.30% to 1.10%, Si: 0.10% to 1.50%, Mn: 0.20% to 1.50%, P: limited to 0.020% or less, S: limited to 0.020% or less and the balance consists of Fe and impurities. In addition, the metallographic structure of the steel wire material includes a ferrite-pearlite structure or a pearlite structure. Here, the conditions of the hot rolling are not particularly specified; however, for example, it is preferable to set the heating temperature of the steel piece in a range of 1000° C. to 1200° C., and to carry out the hot rolling and cooling in an austenite region. Next, the steel wire material obtained through hot rolling is drawn so as to adjust the wire diameter, is heated up to an austenite region, then, is cooled, and then is subjected to a patenting treatment for causing isothermal transformation, thereby producing an intermediate steel wire.

In the above-described drawing process, the steel wire material serving as a material is drawn, thereby obtaining the intermediate steel wire. After that, the obtained intermediate steel wire is deformed so as to be manufactured into a deformed steel wire. The drawing is carried out by drawing the steel wire material using a dice in a cold manner. The deforming process includes flat rolling, first deforming, and second deforming. Specifically, the deforming process includes flat rolling in which the intermediate steel wire is formed so that the lengthwise cross-sectional shape is changed from a circular shape to a plate shape, the first deforming in which, after the flat rolling, the shapes of the edge surfaces in the width direction of the intermediate steel wire obtained from the flat rolling are adjusted, and second deforming in which the intermediate steel wire obtained from the first deforming is bent so that the cross section perpendicular to the longitudinal direction of the intermediate steel wire obtained from the first deforming, that is, the rolling direction has a hollow-fan shape. As described above, the intermediate steel wire turns into the deformed steel wire through the deforming process. Here, the adjustment of the shapes of the edge surfaces after the flat rolling and the bending for providing a hollow-fan shape to the cross section perpendicular to the longitudinal direction are deforming using a grooved roll.

In the method for manufacturing the deformed steel wire for a protection tube of a submarine cable according to the embodiment, the extent of the cross-sectional area reduced by the drawing is extremely important in the drawing process to control the texture on the cross section that is perpendicular to the longitudinal direction and has a hollow-fan shape. As the extent of the cross-sectional area reduced by the drawing, the drawing fraction is used. The drawing fraction refers to a ratio of the reduced cross-sectional area obtained by subtracting the cross-sectional area of the intermediate steel wire from the cross-sectional area of the steel wire material to the total reduced cross-sectional area obtained by subtracting the cross-sectional area of the deformed steel wire from the cross-sectional area of the steel wire material, and is expressed as a percentage. That is, the drawing fraction is a value that is obtained by dividing the cross-sectional area reduced in the drawing process by the value obtained by subtracting the cross-sectional area of the deformed steel wire from the cross-sectional area of the steel wire material, and is expressed as a percentage. Hereinafter, in some cases, the value obtained by subtracting the cross-sectional area of the deformed steel wire from the cross-sectional area of the steel wire material will be called the total reduced area, and the drawing fraction will be called the reduced cross-sectional area fraction by drawing. In the method for manufacturing the deformed steel wire for a protection tube of a submarine cable according to the embodiment, out of the total reduced area while the steel wire material serving as a material is worked into the deformed steel wire having a hollow-fan shape on the cross section, the reduced cross-sectional area fraction by drawing, that is, the drawing fraction is set in a range of 30% to 85%.

In the method for manufacturing the deformed steel wire for a protection tube of a submarine cable according to the embodiment, when the drawing fraction is less than 30%, the integration degree of the crystal orientation <110> in the longitudinal direction of the cross section of the deformed steel wire which is perpendicular to the longitudinal direction and has a hollow-fan shape becomes less than 2.0, and the tensile strength decreases. On the other hand, when the drawing fraction exceeds 85%, the integration degree of the crystal orientation <110> in the longitudinal direction of the cross section exceeds 4.0, and the low-cycle fatigue properties deteriorate. Alternatively, the integration degree of the crystal orientation <100> in the thickness direction in the thickness center area of the cross section is decreased to less than 1.2, and the low-cycle fatigue properties deteriorate.

In the deforming process of the method for manufacturing the deformed steel wire for a protection tube of a submarine cable according to the embodiment, the operation diameter of a roller in a rolling machine carrying out the deforming and the friction coefficient between the surface of the roller in the rolling machine and the intermediate steel wire are important. When the operation diameter of the roller in the rolling machine carrying out the deforming exceeds 350 mm, the intermediate steel wire extends in the rolling direction more than a predetermined range during the deforming, and a necessary dimensional accuracy cannot be obtained. In addition, during the deforming, even in a case in which the friction coefficient between the surface of the roller in the rolling machine and the intermediate steel wire exceeds 0.2, the intermediate steel wire extends in the rolling direction more than a predetermined range, the plastic deformation flow of the intermediate steel wire in the width direction becomes insufficient, and a necessary dimensional accuracy cannot be obtained. Furthermore, in this case, there is a case in which a surface defect is generated. In addition, in a case in which the operation diameter of the roller in the rolling machine carrying out the deforming exceeds 350 mm, or the friction coefficient between the surface of the roller in the rolling machine and the intermediate steel wire exceeds 0.2, a significant difference is caused in the plastic deformation flow between the inner surface area and the outer surface area of the lengthwise cross section of the deformed steel wire having a hollow-fan shape. When a significant difference is caused in the plastic deformation flow, in the inner surface area and the outer surface area on the cross section, the absolute value of the difference in the integration degree of the crystal orientation <110> in the longitudinal direction of the deformed steel wire exceeds 0.3, and the low-cycle fatigue properties deteriorate. Therefore, during the deforming, the upper limit of the operation diameter of the roller in the rolling machine is set to 350 mm. In addition, during the deforming, the upper limit of the friction coefficient between the surface of the roller in the rolling machine and the intermediate steel wire is set to 0.2.

During the deforming process, in a case in which the operation diameter of the roller in the rolling machine carrying out the deforming is less than 210 mm, it becomes difficult to stably produce the lengthwise cross section of the deformed steel wire having a hollow-fan shape. In addition, even in a case in which the friction coefficient between the surface of the roller in the rolling machine and the intermediate steel wire is less than 0.05, it becomes difficult to stably produce the cross section having a hollow-fan shape. Furthermore, in a case in which the operation diameter of the roller in the rolling machine carrying out the deforming is less than 210 mm, or the friction coefficient between the surface of the roller in the rolling machine carrying out the deforming and the intermediate steel wire is less than 0.05, during the second deforming, the amount of the steel wire that has been subjected to the first deforming injected into the groove roll becomes insufficient. Therefore, the dimensional accuracy of the deformed steel wire decreases, and a necessary dimensional accuracy index cannot be obtained. Furthermore, in a case in which the operation diameter of the roller in the rolling machine carrying out the deforming is less than 210 mm, or the friction coefficient between the surface of the roller in the rolling machine carrying out the deforming and the intermediate steel wire is less than 0.05, for example, during the second deforming, there is a case in which the intermediate steel wire protrudes through a void in the roller in the rolling machine, and a defect is generated. Therefore, when the deforming is carried out, the lower limit of the operation diameter of the roller in the rolling machine is set to 210 mm, and the lower limit of the friction coefficient between the surface of the roller in the rolling machine and the intermediate steel wire is set to 0.05.

In addition, in the deforming process, the control of back tension which adjusts the tension on the inlet side of the roller in the rolling machine during the deforming is extremely important. This is because the control of the back tension enables the prevention of a surface defect in the deformed steel wire and the ensuring of the dimensional accuracy. During the deforming, when the back tension is less than 2% of the breakage load of the intermediate steel wire on the inlet side of the roller in the rolling machine, the injection into the roller in the rolling machine becomes unstable, for example, vibrates vertically and horizontally. When the injection into the roller in the rolling machine during the deforming becomes unstable, a defect becomes more likely to be generated on the surface of the deformed steel wire. Furthermore, when the injection into the roller in the rolling machine becomes unstable during the deforming, a necessary dimensional accuracy of the deformed steel wire cannot be obtained. On the other hand, during the deforming, when the back tension exceeds 7% of the breakage load of the intermediate steel wire on the inlet side of the rolling machine, unstable plastic deformation is caused due to the working by the roller in the rolling machine, and consequently, the dimensional accuracy of the deformed steel wire is impaired.

The intermediate steel wire on the inlet side of the roller in the rolling machine during the deforming in the deforming process refers to an intermediate steel wire worked by the previous rolling. That is, the intermediate steel wire worked by the previous rolling means the intermediate steel wire that has been subjected to the drawing in the case of the flat rolling, the intermediate steel wire that has been subjected to the flat rolling in the case of the first deforming that adjusts the shapes of the edge surfaces, and the intermediate steel wire after the first deforming in the case of the second deforming carrying out the bending. In addition, the breakage loads of the respective intermediate steel wires are set to the breakage loads of the intermediate steel wires on the inlet side of the roller in the rolling machine. The breakage load is measured from the tensile test of the intermediate steel wire worked in the previous processes to control the back tension that adjusts the tension of the deforming. In addition, the back tension is controlled on the basis of the breakage load measured from the tensile test.

The deformed steel wire for a protection tube of a submarine cable according to the embodiment is used as described below. First, as shown in FIG. 3, the inner surface area on the cross section of the deformed steel wire 9 which is perpendicular to the longitudinal direction and has a hollow-fan shape is brought into contact with the optical communication fiber 8, and three deformed steel wires are combined in the longitudinal direction in a cylindrical shape, thereby forming the pressure-resistant layer 10. The pressure-resistant layer 10 is used as a protection tube of a submarine cable. That is, the pressure-resistant layer 10 includes three deformed steel wires 9 and the optical communication fiber 8, and the three deformed steel wires 9 are combined around the optical communication fiber 8 in a cylindrical shape. Meanwhile, the number of the deformed steel wires having the pressure-resistant layer according to the embodiment is not limited as long as the deformed steel wires are combined in a cylindrical shape, and for example, the number of the deformed steel wire may be two or four.

EXAMPLES

Next, examples of the invention will be described, but conditions in the examples are simply examples of the conditions adopted to confirm the feasibility and effects of the invention, and the invention is not limited to the examples of the conditions. The invention can adopt a variety of conditions within the scope of the invention as long as the objects of the invention can be achieved.

First, a steel piece having components described in Table 1 was heated to 1100° C., and then was hot rolled. A steel wire material having a wire diameter in a range of 4.0 mm to 6.5 mm was manufactured through the hot rolling. The metallographic structure of the obtained steel wire material was a ferrite-pearlite or pearlite-only structure. As a pretreatment of the drawing process, scale on the surface of the steel wire material was removed through bending and short blasting. After the short blasting, the steel wire material was washed, then, a lubricant was applied, and then was dried. A patenting treatment was carried out on the obtained steel wire material, thereby carrying out drawing in the drawing process.

[Table 1]

The drawing in the drawing process was carried out using a plurality of dice having a total dice approach angle in a range of 10° to 14°. The area reduction rates by the respective dice were set in a range of 15% to 35%. In the subsequent deforming process, flat rolling was carried out on the drawn intermediate steel wire. The flat rolling is to carry out deforming on the lengthwise cross section of the intermediate steel wire having a circular shape using a flat roll. In the first deforming after the flat rolling, deforming in which the widthwise edge surface of the intermediate steel wire, which had not been brought into contact with the flat roll, was reduced at a slant was carried out on the flat-rolled intermediate steel wire. This deforming turned the shape of the lengthwise cross section of the intermediate steel wire that had been subjected to the first deforming into a trapezoidal shape. In addition, in the second deforming after the first deforming, deforming was carried out on the intermediate steel wire that had been subjected to the first deforming so that the intermediate steel wire was extruded outside from the center of a short side of the trapezoidal shape along the short side on the cross section of the intermediate steel wire worked by the first deforming so as to have a trapezoidal shape in the longitudinal direction. In addition, in the second deforming, deforming was carried out so that the edge section on the long side of the trapezoidal shape was forcibly inserted inside from outside on the cross section of the intermediate steel wire worked by the first deforming so as to have a trapezoidal shape in the longitudinal direction. From the second deforming, a deformed steel wire having a hollow-fan shape on the lengthwise cross section was obtained.

At this time, during the deforming process, a tension detector and a tension-applying apparatus were installed on the inlet side of the roller in the rolling machine, and back tension was applied and controlled. After the drawing process and the respective rolling processes in the deforming process, the respective breakage loads of the intermediate steel wire obtained by the previous processes were measured through a tensile test. In addition, the back tension was controlled on the basis of the respective breakage loads obtained from the measurements.

The radius, that is, wire diameter and cross-sectional area of the steel wire material that was a material, the radius, that is, wire diameter and cross-sectional area of the intermediate steel wire after the drawing, and the cross-sectional area of the deformed steel wire after the deforming are described in Table 2 together with the manufacturing conditions.

[Table 2]

A TD surface at the center in the circumferential direction of the cross section of the deformed steel wire obtained through the drawing process and the deforming process, which is perpendicular to the longitudinal direction and has a hollow-fan shape, was used as a measurement surface, and the texture was measured through EBSD. Before the measurement, the measurement surface of the deformed steel wire was mirror-polished, and furthermore, vibration polishing was carried out to remove strain. The texture was measured using EBSD on the center axis in the circumferential direction of the cross section that is perpendicular to the longitudinal direction and has a hollow-fan shape, and in the thickness center area, the inner surface area, and the outer surface area in the thickness direction of the cross section. As a result of an observation using an optical microscope, the metallographic structure of the deformed steel wire was a ferrite-pearlite structure or a pearlite-only structure.

The tensile strength of the deformed steel wire was measured using an Instron-type tensile tester on the basis of JIS Z 2241. As described in Table 3, deformed steel wires having a tensile strength of 1200 MP or more was evaluated to have a sufficient tensile strength. In addition, the low-cycle fatigue test of the deformed steel wire was carried out through a pulsating tensile test using a specimen having a distance between grades of 8 mm. In this low-cycle fatigue test, strain was applied under a strain amplitude $\Delta\epsilon$ in a range of 2% to 6%, a strain velocity $\epsilon'$ of 0.4%/s, and a test waveform of a triangle wave having a repetition velocity of 0.050 Hz. In the low-cycle fatigue test, the repetition number Nf until the specimen broke was measured. This test result was replaced into Formula (1) of $A=Nf/\Delta\epsilon^{-0.3885}$, and the low-cycle fatigue coefficient A was computed. In a case in which the low-cycle fatigue coefficient A was 15 or more, as described in Table 3, deformed steel wires are evaluated to have sufficient low-cycle fatigue properties during the installation of a submarine cable.

As described in Table 3, defects in the deformed steel wire are evaluated using defect grades of 0 to 3. First, surface defects on the deformed steel wire were determined using a tentacle wrapped with a cotton work glove and the visual observation of the surface. Specifically, a specimen having a length in a range of 10 m to 20 m was sampled from the manufactured deformed steel wire. Next, the sampled specimen was rubbed by hands in the cotton work gloves throughout the entire length. At this time, the specimen could be rubbed at a slant, and a specimen from which a so-called "hachure line" was not observed was evaluated to "have no defect", and was given a defect grade of zero. In addition, in the evaluation method, a case in which the cotton work glove was stuck to the surface of the specimen and a hachure line was observed was given a defect grade of 1 to 3. The defect grade of one indicates a case in which a section on the surface of the specimen to which the cotton work glove was stuck was smaller than a defect limit sample photograph when compared with the sample photograph, which was evaluated to be permissible. The defect grade of two indicates a case in which a section on the surface of the specimen to which the cotton work glove was stuck was larger than the defect limit sample photograph when compared with the sample photograph, which was evaluated to be permissible. In addition, a case in which, compared with the defect limit sample photograph, a defect is significantly large, and the deformed steel wire broke during an operation was given a defect grade of three. In addition, in Table 3, only cases in which the dimensional accuracy index was in a range of 0.5 to 2.0 are evaluated as a "good" dimensional accuracy, and other cases are indicated to be "no good".

The above-described results are described in Table 3. Invention Examples 01 to 13 satisfied the integration degree and dimensional accuracy of the necessary texture of the invention, and obtained mechanical properties having a sufficient tensile strength and a sufficient low-cycle fatigue coefficient A. Furthermore, as described in Table 2, the manufacturing conditions were preferable.

Meanwhile, in Comparative Examples 14 to 16, the texture in the thickness center area and the texture in the lengthwise cross section failed to satisfy the necessary conditions of the invention. Furthermore, regarding the manufacturing conditions, Comparative Examples 14 to 16 had a high drawing fraction, which was not preferable. As a result, the low-cycle fatigue properties degraded.

[Table 3]

Comparative Examples 17 to 19 have insufficient integration degrees of the crystal orientation <110> into the inner surface area and the outer surface area on the lengthwise cross section of the deformed steel wire. Furthermore, Comparative Examples 17 to 19 had insufficient drawing fractions. As a result, the tensile strength was decreased.

Comparative Example 20, regarding the manufacturing conditions, had an insufficient back tension during the deforming, and thus the dimensional accuracy index failed to satisfy the necessary range of the invention, and the surface properties deteriorated.

Comparative Example 21, regarding the manufacturing conditions, had a high back tension during the deforming, which was not preferable, and thus the amount of the steel wire injected into the groove roll was insufficient. Therefore, the dimensional accuracy index failed to satisfy the necessary range of the invention, and the surface properties deteriorated.

In Comparative Examples 22 to 24, a necessary dimensional accuracy could not be obtained, a significant difference was caused in the plastic deformation flow in the inner surface area and the outer surface area in the longitudinal direction of the deformed steel wire, and consequently, the absolute value of the difference in the integration degree of the crystal orientation <110> in the longitudinal direction in the inner surface area and the outer surface area of the deformed steel wire exceeded the range of the invention. In addition, in Comparative Examples 22 to 24, a surface defect was generated.

Furthermore, in Comparative Examples 22 to 24, the roller friction coefficient between the surface of the roller in the rolling machine and the intermediate steel wire during the deforming was large, which was not preferable, and thus the intermediate steel wire extended in the rolling direction more than a predetermined range, the widthwise plastic deformation flow of the intermediate steel wire was insufficient, and a sufficient low-cycle fatigue coefficient A could not be obtained.

As a result, in Comparative Examples 22 to 24, the low-cycle fatigue properties deteriorated.

In Comparative Examples 25 to 27, a significant difference was caused in the plastic deformation flow in the inner surface area and the outer surface area on the lengthwise cross section of the deformed steel wire, and the difference in the integration degree of the crystal orientation <110> in the longitudinal direction in the inner surface area and the outer surface area on the lengthwise cross section of the deformed steel wire exceeded the range of the invention. Particularly, in Comparative Examples 25 and 26, the dimensional accuracy index failed to satisfy the necessary range of the invention, a defect was generated on the surface, and the surface properties deteriorated.

Furthermore, in Comparative Examples 25 to 27, during the deforming, the operation diameter of the roller in the rolling machine was large, which was not preferable, and thus a sufficient low-cycle fatigue coefficient A could not be obtained.

As a result, in Comparative Examples 25 to 27, the low-cycle fatigue properties deteriorated.

In Comparative Examples 28 and 29, the dimensional accuracy index of the lengthwise cross section of the deformed steel wire was below the necessary range of the invention, and the surface properties deteriorated. In Comparative Examples 28 and 29, a defect was generated on the surface. Furthermore, in Comparative Examples 28 and 29, during the deforming, the operation diameter of the roller in the rolling machine was small and not sufficient, and thus the amount of the deformed steel wire injected into the roll was insufficient, and the intermediate steel wire was jammed.

In Comparative Examples 30 and 31, the dimensional accuracy index of the lengthwise cross section of the deformed steel wire was above the necessary range of the invention, and the surface properties deteriorated. Furthermore, in Comparative Examples 30 and 31, during the deforming, the friction coefficient between the surface of the roller in the rolling machine and the intermediate steel wire was not sufficient, and thus the amount of the deformed steel wire injected into the groove roll was insufficient.

Regarding the chemical composition of the steel in Comparative Example 32, the C content was 0.15%, which was below the range of the invention. As a result, the work hardening rate of the deformed steel wire was low, and the tensile strength was decreased.

Regarding the chemical composition of the steel in Comparative Example 33, the C content was 1.20%, which was above the range of the invention. As a result, the cold workability degraded due to the precipitation of pro-eutectoid cementite, a sufficient low-cycle fatigue coefficient A could not be obtained, and the low-cycle fatigue properties deteriorated.

INDUSTRIAL APPLICABILITY

According to the invention, it is possible to provide a deformed steel wire having a high strength and excellent low-cycle fatigue properties by controlling the chemical component or texture of the deformed steel wire. According to the invention, it becomes possible to remove a concern of a cable breakage accident caused by bad weather, ocean waves, and the like when a power or communication cable is installed in the ocean from a vessel in addition to a decrease in the installation costs of a cable, the simplification and shortening of construction by the weight reduction of the cable. Therefore, the invention is highly applicable to industries.

BRIEF DESCRIPTION OF THE REFERENCE SYMBOLS

1: OUTER SURFACE AREA
2: INNER SURFACE AREA
3: THICKNESS CENTER AREA
R: INNER ANGLES AT TWO EDGES OF INNER SURFACE
5: TD SURFACE
6: THICKNESS DIRECTION
7: LONGITUDINAL DIRECTION
8: OPTICAL COMMUNICATION FIBER
9: DEFORMED STEEL WIRE
10: PRESSURE-RESISTANT LAYER

TABLE 1

| STEEL | C | Mn | Si | P | S | Cr | B |
|---|---|---|---|---|---|---|---|
| A | 0.62 | 0.51 | 0.20 | 0.015 | 0.020 | 0.01 | — |
| B | 0.82 | 0.50 | 0.21 | 0.018 | 0.018 | 0.02 | — |
| C | 0.92 | 0.54 | 0.19 | 0.020 | 0.009 | 0.01 | — |
| D | 0.82 | 0.54 | 0.19 | 0.015 | 0.015 | 0.20 | — |
| E | 0.92 | 0.49 | 0.22 | 0.020 | 0.009 | 0.30 | — |
| F | 0.82 | 0.51 | 0.20 | 0.015 | 0.012 | 0.01 | 0.0010 |
| G | <u>0.15</u> | 0.51 | 0.20 | 0.010 | 0.015 | 0.01 | — |
| H | <u>1.20</u> | 0.49 | 0.20 | 0.010 | 0.010 | 0.91 | — |

UNDERLINES INDICATE THAT VALUES ARE OUTSIDE THE RANGE OF THE INVENTION.
UNIT: MASS %

TABLE 2

| TYPE | NO. | STEEL | STEEL WIRE MATERIAL | | INTERMEDIATE STEEL WIRE | | DEFORMED STEEL WIRE CROSS-SECTIONAL AREA (MM²) | MANUFACTURING CONDITIONS | | | |
|---|---|---|---|---|---|---|---|---|---|---|---|
| | | | WIRE DIAMETER (MM) | CROSS-SECTIONAL AREA (MM²) | DRAWN WIRE DIAMETER (MM) | CROSS-SECTIONAL AREA (MM²) | | DRAWING FRACTION (%) | OPERATION DIAMETER OF ROLLER (MM) | FRICTION COEFFICIENT BETWEEN ROLLER SURFACE AND INTERMEDIATE STEEL WIRE(-) | BACK TENSION (%) |
| INVENTION EXAMPLE | 01 | A | 6.0 | 28.26 | 3.90 | 11.94 | 7.65 | 79.2 | 290 | 0.10 | 5.0 |
| INVENTION EXAMPLE | 02 | A | 5.5 | 23.75 | 3.90 | 11.94 | 7.32 | 71.9 | 290 | 0.10 | 5.0 |
| INVENTION EXAMPLE | 03 | A | 4.0 | 12.56 | 3.70 | 10.75 | 7.12 | 33.3 | 250 | 0.07 | 6.0 |
| INVENTION EXAMPLE | 04 | B | 6.0 | 28.26 | 3.90 | 11.94 | 7.65 | 79.2 | 250 | 0.07 | 5.0 |
| INVENTION EXAMPLE | 05 | C | 6.0 | 28.26 | 3.90 | 11.94 | 7.85 | 80.0 | 290 | 0.10 | 6.0 |
| INVENTION EXAMPLE | 06 | A | 6.0 | 28.26 | 3.90 | 11.94 | 7.85 | 80.0 | 230 | 0.05 | 5.5 |
| INVENTION EXAMPLE | 07 | A | 6.0 | 28.26 | 3.90 | 11.94 | 7.85 | 80.0 | 240 | 0.18 | 5.5 |
| INVENTION EXAMPLE | 08 | A | 6.0 | 28.26 | 3.90 | 11.94 | 7.85 | 80.0 | 255 | 0.20 | 5.5 |
| INVENTION EXAMPLE | 09 | A | 6.0 | 28.26 | 3.90 | 11.94 | 7.85 | 80.0 | 260 | 0.15 | 5.5 |
| INVENTION EXAMPLE | 10 | D | 6.0 | 28.26 | 3.90 | 11.94 | 7.85 | 80.0 | 270 | 0.16 | 2.5 |
| INVENTION EXAMPLE | 11 | E | 6.0 | 28.26 | 3.90 | 11.94 | 7.85 | 80.0 | 290 | 0.16 | 3.0 |
| INVENTION EXAMPLE | 12 | A | 6.0 | 28.26 | 3.90 | 11.94 | 7.85 | 80.0 | 290 | 0.16 | 3.0 |
| INVENTION EXAMPLE | 13 | F | 6.0 | 28.26 | 3.90 | 11.94 | 7.85 | 80.0 | 290 | 0.16 | 5.0 |
| COMPARATIVE EXAMPLE | 14 | A | 6.0 | 28.26 | 3.25 | 8.29 | 7.85 | 97.8 | 290 | 0.10 | 5.0 |
| COMPARATIVE EXAMPLE | 15 | B | 6.0 | 28.26 | 3.30 | 8.55 | 7.65 | 95.6 | 280 | 0.08 | 4.0 |
| COMPARATIVE EXAMPLE | 16 | C | 6.0 | 28.26 | 3.26 | 8.34 | 7.63 | 96.5 | 280 | 0.08 | 4.0 |
| COMPARATIVE EXAMPLE | 17 | B | 6.0 | 28.26 | 5.40 | 22.89 | 8.54 | 27.2 | 290 | 0.10 | 4.0 |
| COMPARATIVE EXAMPLE | 18 | D | 6.0 | 28.26 | 5.40 | 22.89 | 8.63 | 27.4 | 280 | 0.08 | 5.0 |
| COMPARATIVE EXAMPLE | 19 | E | 6.0 | 28.26 | 5.40 | 22.89 | 6.63 | 24.8 | 280 | 0.08 | 4.0 |
| COMPARATIVE EXAMPLE | 20 | A | 6.0 | 28.26 | 3.90 | 11.94 | 7.65 | 79.2 | 290 | 0.10 | 4.0 |
| COMPARATIVE EXAMPLE | 21 | B | 6.0 | 28.26 | 3.90 | 11.94 | 7.65 | 79.2 | 290 | 0.10 | 1.5 |
| COMPARATIVE EXAMPLE | 22 | A | 6.0 | 28.26 | 3.90 | 11.94 | 7.65 | 79.2 | 280 | 0.10 | 10.0 |
| COMPARATIVE EXAMPLE | 23 | B | 5.5 | 23.75 | 3.90 | 11.94 | 7.65 | 73.3 | 280 | 0.30 | 5.0 |
| COMPARATIVE EXAMPLE | 24 | C | 5.5 | 23.75 | 3.90 | 11.94 | 7.65 | 73.3 | 280 | 0.30 | 4.5 |
| COMPARATIVE EXAMPLE | 25 | A | 6.0 | 28.26 | 3.90 | 11.94 | 7.65 | 79.2 | 400 | 0.07 | 5.0 |
| COMPARATIVE EXAMPLE | 26 | B | 6.0 | 28.26 | 3.90 | 11.94 | 7.63 | 79.1 | 420 | 0.05 | 4.3 |
| COMPARATIVE EXAMPLE | 27 | D | 6.0 | 28.26 | 3.90 | 11.94 | 7.65 | 79.2 | 500 | 0.05 | 4.2 |
| COMPARATIVE EXAMPLE | 28 | A | 6.0 | 28.26 | 3.90 | 11.94 | 7.65 | 79.2 | 150 | 0.08 | 4.1 |
| COMPARATIVE EXAMPLE | 29 | A | 6.0 | 28.26 | 3.90 | 11.94 | 7.65 | 79.2 | 120 | 0.08 | 4.1 |
| COMPARATIVE EXAMPLE | 30 | A | 6.0 | 28.26 | 3.90 | 11.94 | 7.65 | 79.2 | 290 | 0.014 | 4.0 |
| COMPARATIVE EXAMPLE | 31 | A | 6.0 | 28.26 | 3.90 | 11.94 | 7.65 | 79.2 | 290 | 0.005 | 5.0 |
| COMPARATIVE EXAMPLE | 32 | G | 6.0 | 28.26 | 3.70 | 10.75 | 7.12 | 82.8 | 250 | 0.07 | 5.0 |
| COMPARATIVE EXAMPLE | 33 | H | 6.0 | 28.26 | 3.90 | 11.94 | 7.85 | 80.0 | 240 | 0.18 | 5.5 |

UNDERLINES INDICATE THAT VALUES ARE OUTSIDE THE RANGE OF THE INVENTION.

TABLE 3(a)

| | | | MECHANICAL PROPERTIES | | TEXTURE | | | | | |
|---|---|---|---|---|---|---|---|---|---|---|
| | | | | | THICKNESS CENTER AREA | | SURFACE LAYER AREA | | | SURFACE PROPERTIES | |
| TYPE | NO. | STEEL | TENSILE STRENGTH (MPA) | LOW-CYCLE FATIGUE COEFFICIENT A (—) | INTEGRATION DEGREE OF CRYSTAL ORIENTATION <110> IN LONGITUDINAL DIRECTION | INTEGRATION DEGREE OF CRYSTAL ORIENTATION <100> IN THICKNESS DIRECTION | INTEGRATION DEGREE OF CRYSTAL ORIENTATION <110> IN LONGITUDINAL DIRECTION OF INNER SURFACE | INTEGRATION DEGREE OF CRYSTAL ORIENTATION <110> IN LONGITUDINAL DIRECTION OF OUTER SURFACE | ABSOLUTE VALUE OF DIFFERENCE IN INTEGRATION DEGREE OF CRYSTAL ORIENTATION <110> IN LONGITUDINAL DIRECTION BETWEEN INNER SURFACE AND OUTER SURFACE | DEFECT GRADE (—) | DIMENSIONAL ACCURACY |
| INVENTION EXAMPLE | 01 | A | 1320 | 20 | 2.22 | 1.20 | 2.50 | 2.60 | 0.10 | 0 | GOOD |
| INVENTION EXAMPLE | 02 | A | 1315 | 18 | 2.30 | 1.32 | 3.00 | 2.90 | 0.10 | 0 | GOOD |
| INVENTION EXAMPLE | 03 | A | 1380 | 19 | 2.49 | 1.23 | 2.50 | 2.75 | 0.25 | 0 | GOOD |
| INVENTION EXAMPLE | 04 | B | 1750 | 21 | 2.61 | 1.42 | 2.60 | 2.80 | 0.20 | 0 | GOOD |
| INVENTION EXAMPLE | 05 | C | 1982 | 17 | 2.40 | 1.36 | 2.45 | 2.70 | 0.25 | 0 | GOOD |
| INVENTION EXAMPLE | 06 | A | 1965 | 16 | 2.30 | 1.56 | 2.63 | 2.53 | 0.10 | 0 | GOOD |
| INVENTION EXAMPLE | 07 | A | 1986 | 17 | 2.31 | 1.52 | 2.56 | 2.53 | 0.03 | 0 | GOOD |
| INVENTION EXAMPLE | 08 | A | 1956 | 23 | 2.56 | 1.56 | 2.21 | 2.30 | 0.09 | 0 | GOOD |
| INVENTION EXAMPLE | 09 | A | 1982 | 16 | 2.63 | 1.53 | 2.56 | 2.53 | 0.03 | 0 | GOOD |
| INVENTION EXAMPLE | 10 | D | 1990 | 21 | 2.56 | 1.45 | 2.68 | 2.53 | 0.15 | 0 | GOOD |
| INVENTION EXAMPLE | 11 | E | 1956 | 24 | 2.45 | 1.63 | 2.41 | 2.53 | 0.12 | 0 | GOOD |
| INVENTION EXAMPLE | 12 | A | 1942 | 23 | 2.43 | 1.53 | 2.63 | 2.53 | 0.10 | 0 | GOOD |
| INVENTION EXAMPLE | 13 | F | 1953 | 25 | 2.53 | 1.53 | 2.50 | 2.36 | 0.14 | 0 | GOOD |
| COMPARATIVE EXAMPLE | 14 | A | 1453 | 12 | 1.23 | 1.02 | 4.33 | 4.10 | 0.23 | 0 | GOOD |
| COMPARATIVE EXAMPLE | 15 | B | 1463 | 11 | 1.24 | 1.03 | 4.23 | 4.20 | 0.03 | 0 | GOOD |
| COMPARATIVE EXAMPLE | 16 | C | 1453 | 11 | 1.13 | 1.01 | 4.12 | 4.23 | 0.11 | 0 | GOOD |
| COMPARATIVE EXAMPLE | 17 | B | 1186 | 19 | 3.21 | 1.23 | 1.80 | 1.40 | 0.40 | 0 | GOOD |

TABLE 3(a)-continued

| | | MECHANICAL PROPERTIES | | TEXTURE | | | | | SURFACE PROPERTIES | |
|---|---|---|---|---|---|---|---|---|---|---|
| | | | | THICKNESS CENTER AREA | | SURFACE LAYER AREA | | | | |
| TYPE | STEEL NO. | TENSILE STRENGTH (MPA) | LOW-CYCLE FATIGUE COEFFICIENT A (—) | INTEGRATION DEGREE OF CRYSTAL ORIENTATION <110> IN LONGITUDINAL DIRECTION | INTEGRATION DEGREE OF CRYSTAL ORIENTATION <100> IN THICKNESS DIRECTION | INTEGRATION DEGREE OF CRYSTAL ORIENTATION <110> IN LONGITUDINAL DIRECTION OF INNER SURFACE | INTEGRATION DEGREE OF CRYSTAL ORIENTATION <110> IN LONGITUDINAL DIRECTION OF OUTER SURFACE | ABSOLUTE VALUE OF DIFFERENCE IN INTEGRATION DEGREE OF CRYSTAL ORIENTATION <110> IN LONGITUDINAL DIRECTION BETWEEN INNER SURFACE AND OUTER SURFACE | DEFECT GRADE (—) | DIMENSIONAL ACCURACY |

EXAMPLE

UNDERLINES INDICATE THAT VALUES ARE OUTSIDE THE RANGE OF THE INVENTION.
CASES IN WHICH THE DIMENSIONAL ACCURACY INDEX IS IN A RANGE OF 0.5 TO 2.0 WERE EVALUATED AS A "GOOD" DIMENSIONAL ACCURACY, AND OTHER CASES WERE INDICATED TO BE "NO GOOD".

TABLE 3(b)

| | | | MECHANICAL PROPERTIES | | TEXTURE | | | | | |
|---|---|---|---|---|---|---|---|---|---|---|
| | | | | | | | SURFACE LAYER AREA | | | SURFACE PROPERTIES |
| TYPE | NO. | STEEL | TENSILE STRENGTH (MPA) | LOW-CYCLE FATIGUE COEFFICIENT A (—) | INTEGRATION DEGREE OF CRYSTAL ORIENTATION <110> IN LONGITUDINAL DIRECTION | INTEGRATION DEGREE OF CRYSTAL ORIENTATION <100> IN THICKNESS DIRECTION | INTEGRATION DEGREE OF CRYSTAL ORIENTATION <110> IN LONGITUDINAL DIRECTION OF INNER SURFACE | INTEGRATION DEGREE OF CRYSTAL ORIENTATION <110> IN LONGITUDINAL DIRECTION OF OUTER SURFACE | ABSOLUTE VALUE OF DIFFERENCE IN INTEGRATION DEGREE OF CRYSTAL ORIENTATION <110> IN LONGITUDINAL DIRECTION BETWEEN INNER SURFACE AND OUTER SURFACE | DEFECT GRADE (—) / DIMENSIONAL ACCURACY |
| COMPARATIVE EXAMPLE | 18 | D | 1102 | 18 | 3.12 | 1.53 | 1.72 | 1.20 | 0.52 | 0 / GOOD |
| COMPARATIVE EXAMPLE | 19 | E | 1105 | 18 | 3.45 | 1.63 | 1.56 | 1.32 | 0.24 | 0 / GOOD |
| COMPARATIVE EXAMPLE | 20 | A | 1385 | 20 | 2.40 | 1.35 | 2.60 | 2.35 | 0.25 | 3 / NO GOOD |
| COMPARATIVE EXAMPLE | 21 | B | 1452 | 20 | 2.36 | 1.23 | 2.53 | 2.35 | 0.18 | 0 / NO GOOD |
| COMPARATIVE EXAMPLE | 22 | A | 1380 | 13 | 2.70 | 1.56 | 4.10 | 2.55 | 1.55 | 1 / NO GOOD |
| COMPARATIVE EXAMPLE | 23 | B | 1452 | 13 | 2.63 | 1.23 | 4.23 | 2.53 | 1.70 | 2 / NO GOOD |
| COMPARATIVE EXAMPLE | 24 | C | 1423 | 13 | 2.43 | 1.45 | 4.56 | 2.54 | 2.02 | 1 / NO GOOD |
| COMPARATIVE EXAMPLE | 25 | A | 1385 | 14 | 2.40 | 1.47 | 4.20 | 2.80 | 1.40 | 1 / NO GOOD |
| COMPARATIVE EXAMPLE | 26 | B | 1423 | 12 | 2.50 | 1.23 | 4.36 | 2.71 | 1.65 | 0 / GOOD |
| COMPARATIVE EXAMPLE | 27 | D | 1562 | 13 | 2.63 | 1.57 | 4.25 | 2.60 | 1.65 | 0 / GOOD |
| COMPARATIVE EXAMPLE | 28 | A | 1423 | 20 | 2.50 | 1.65 | 2.60 | 2.30 | 0.22 | 2 / NO GOOD |
| COMPARATIVE EXAMPLE | 29 | A | 1385 | 21 | 2.30 | 1.78 | 2.40 | 2.41 | 0.24 | 3 / NO GOOD |
| COMPARATIVE EXAMPLE | 30 | A | 1450 | 21 | 2.31 | 1.53 | 2.53 | 2.45 | 0.08 | 0 / NO GOOD |
| COMPARATIVE EXAMPLE | 31 | A | 1436 | 21 | 2.22 | 1.26 | 2.54 | 2.36 | 0.18 | 0 / NO GOOD |
| COMPARATIVE EXAMPLE | 32 | G | 910 | 22 | 2.49 | 1.23 | 2.60 | 2.50 | 0.10 | 0 / GOOD |
| COMPARATIVE EXAMPLE | 33 | H | 2152 | 5 | 2.31 | 1.52 | 2.53 | 2.56 | 0.03 | 0 / GOOD |

TABLE 3(b)-continued

| | MECHANICAL PROPERTIES | | | TEXTURE | | | | | SURFACE PROPERTIES | |
|---|---|---|---|---|---|---|---|---|---|---|
| | | | | | | SURFACE LAYER AREA | | | | |
| TYPE NO. STEEL | TENSILE STRENGTH (MPA) | LOW-CYCLE FATIGUE COEFFICIENT A (—) | INTEGRATION DEGREE OF CRYSTAL ORIENTATION <110> IN LONGITUDINAL DIRECTION | INTEGRATION DEGREE OF CRYSTAL ORIENTATION <100> IN THICKNESS DIRECTION | INTEGRATION DEGREE OF CRYSTAL ORIENTATION <110> IN LONGITUDINAL DIRECTION OF INNER SURFACE | INTEGRATION DEGREE OF CRYSTAL ORIENTATION <110> IN LONGITUDINAL DIRECTION OF OUTER SURFACE | ABSOLUTE VALUE OF DIFFERENCE IN INTEGRATION DEGREE OF CRYSTAL ORIENTATION <110> IN LONGITUDINAL DIRECTION BETWEEN INNER SURFACE AND OUTER SURFACE | | DEFECT GRADE (—) | DIMENSIONAL ACCURACY |

EXAMPLE

UNDERLINES INDICATE THAT VALUES ARE OUTSIDE THE RANGE OF THE INVENTION.
CASES IN WHICH THE DIMENSIONAL ACCURACY INDEX IS IN A RANGE OF 0.5 TO 2.0 WERE EVALUATED AS A "GOOD" DIMENSIONAL ACCURACY, AND OTHER CASES WERE INDICATED TO BE "NO GOOD".

The invention claimed is:

1. A deformed steel wire comprising, as a chemical component, by mass %:
C: 0.30% to 1.10%;
Si: 0.10% to 1.50%;
Mn: 0.20% to 1.50%;
P: limited to 0.020% or less;
S: limited to 0.020% or less; and
the balance consisting of Fe and impurities,
wherein a metallographic structure includes a ferrite-pearlite structure or a pearlite structure,
wherein a cross section perpendicular to a longitudinal direction has a hollow-fan shape,
in a thickness center area, an inner surface area, and an outer surface area on the cross section, integration degrees of a crystal orientation <110> in the longitudinal direction are respectively in a range of 2.0 to 4.0,
an absolute value of a difference in the integration degree of the crystal orientation <110> in the longitudinal direction between the inner surface area and the outer surface area on the cross section is 0.3 or less,
in the thickness center area on the cross section, an integration degree of a crystal orientation <100> in a thickness direction is in a range of 1.2 to 3.8, and
when inner angles at two facing edges of an inner surface on the cross section are represented by R1 and R2 respectively, a dimensional accuracy index represented by a ratio of the R2 to the R1 is in a range of 0.5 to 2.0.

2. The deformed steel wire according to claim 1, wherein the chemical component further includes, by mass %, either or both of
Cr: 0.01% to 1.00%; and
B: 0.0004% to 0.0030%.

3. The deformed steel wire according to claim 1, wherein a tensile strength obtained from a tensile test based on JIS Z 2241 is 1200 MPa or more; and
in a low-cycle fatigue test in which a strain amplitude $\Delta\epsilon$ is set in a range of 2% to 6%, a strain velocity $\epsilon'$ is set to 0.4%/s, and a test waveform is set to a triangle wave having a repetition velocity of 0.050 Hz, a low-cycle fatigue coefficient A computed from the following Formula 1 is 15 or more, $$A = Nf/\Delta\epsilon^{-0.3885} \quad \text{(Formula 1)}.$$

4. The deformed steel wire according to claim 2, wherein a tensile strength obtained from a tensile test based on JIS Z 2241 is 1200 MPa or more; and
in a low-cycle fatigue test in which a strain amplitude $\Delta\epsilon$ is set in a range of 2% to 6%, a strain velocity $\epsilon'$ is set to 0.4%/s, and a test waveform is set to a triangle wave having a repetition velocity of 0.050 Hz, a low-cycle fatigue coefficient A computed from the following Formula 1 is 15 or more, $$A = Nf/\Delta\epsilon^{-0.3885} \quad \text{(Formula 1)}.$$

5. A method for manufacturing the deformed steel wire according to claim 1, comprising:
drawing process of drawing a steel wire material having a metallographic structure of a ferrite-pearlite structure or a pearlite structure so as to obtain an intermediate steel wire; and
deforming process of deforming the intermediate steel wire so as to obtain a deformed steel wire after the drawing process,
wherein, during the drawing process, when a percentage of a ratio of a reduced cross-sectional area obtained by subtracting a cross-sectional area of the intermediate steel wire from a cross-sectional area of the steel wire material to a total reduced cross-sectional area obtained by subtracting a cross-sectional area of the deformed steel wire from the cross-sectional area of the steel wire material is set to a drawing fraction, the drawing is carried out at the drawing fraction in a range of 30% to 85%, and
during the deforming process, an operation diameter of a roller is set in a range of 210 mm to 350 mm, a friction coefficient between a surface of the roller and the intermediate steel wire is set in a range of 0.05 to 0.2, back tension is set in a range of 2% to 7% of a breaking load of the intermediate steel wire, which has been obtained in advance, and the deforming is carried out.

6. A method for manufacturing the deformed steel wire according to claim 2, comprising:
drawing process of drawing a steel wire material having a metallographic structure of a ferrite-pearlite structure or a pearlite structure so as to obtain an intermediate steel wire; and
deforming process of deforming the intermediate steel wire so as to obtain a deformed steel wire after the drawing process,
wherein, during the drawing process, when a percentage of a ratio of a reduced cross-sectional area obtained by subtracting a cross-sectional area of the intermediate steel wire from a cross-sectional area of the steel wire material to a total reduced cross-sectional area obtained by subtracting a cross-sectional area of the deformed steel wire from the cross-sectional area of the steel wire material is set to a drawing fraction, the drawing is carried out at the drawing fraction in a range of 30% to 85%, and
during the deforming process, an operation diameter of a roller is set in a range of 210 mm to 350 mm, a friction coefficient between a surface of the roller and the intermediate steel wire is set in a range of 0.05 to 0.2, back tension is set in a range of 2% to 7% of a breaking load of the intermediate steel wire, which has been obtained in advance, and the deforming is carried out.

7. A method for manufacturing the deformed steel wire according to claim 3, comprising:
drawing process of drawing a steel wire material having a metallographic structure of a ferrite-pearlite structure or a pearlite structure so as to obtain an intermediate steel wire; and
deforming process of deforming the intermediate steel wire so as to obtain a deformed steel wire after the drawing process,
wherein, during the drawing process, when a percentage of a ratio of a reduced cross-sectional area obtained by subtracting a cross-sectional area of the intermediate steel wire from a cross-sectional area of the steel wire material to a total reduced cross-sectional area obtained by subtracting a cross-sectional area of the deformed steel wire from the cross-sectional area of the steel wire material is set to a drawing fraction, the drawing is carried out at the drawing fraction in a range of 30% to 85%, and
during the deforming process, an operation diameter of a roller is set in a range of 210 mm to 350 mm, a friction coefficient between a surface of the roller and the intermediate steel wire is set in a range of 0.05 to 0.2, back tension is set in a range of 2% to 7% of a breaking load of the intermediate steel wire, which has been obtained in advance, and the deforming is carried out.

8. A pressure-resistant layer comprising:
three deformed steel wires according to claim 1; and
an optical communication fiber,
wherein the three deformed steel wires are combined in a cylindrical shape around the optical communication fiber.

9. A pressure-resistant layer comprising:
three deformed steel wires according to claim 2; and
an optical communication fiber,
wherein the three deformed steel wires are combined in a cylindrical shape around the optical communication fiber.

10. A pressure-resistant layer comprising:
three deformed steel wires according to claim 3; and
an optical communication fiber,
wherein the three deformed steel wires are combined in a cylindrical shape around the optical communication fiber.

* * * * *